US012623167B2

(12) United States Patent
Chilwarwar

(10) Patent No.: US 12,623,167 B2
(45) Date of Patent: May 12, 2026

(54) WATER PURIFICATION SYSTEM AND METHOD

(71) Applicant: Kaustubh Chilwarwar, Davie, FL (US)

(72) Inventor: Kaustubh Chilwarwar, Davie, FL (US)

( * ) Notice: Subject to any disclaimer, the term of this patent is extended or adjusted under 35 U.S.C. 154(b) by 470 days.

(21) Appl. No.: 18/231,846

(22) Filed: Aug. 9, 2023

(65) Prior Publication Data

US 2025/0050250 A1     Feb. 13, 2025

(51) Int. Cl.
| | |
|---|---|
| *B01D 29/46* | (2006.01) |
| *B01D 39/14* | (2006.01) |
| *C02F 1/00* | (2023.01) |

(52) U.S. Cl.
CPC ............. *B01D 29/46* (2013.01); *B01D 39/14* (2013.01); *C02F 1/001* (2013.01); *B01D 2239/0421* (2013.01); *C02F 2201/006* (2013.01)

(58) Field of Classification Search
CPC ............................... B01D 29/46; B01D 39/14; B01D 2239/0421; C02F 1/001; C02F 2201/006
See application file for complete search history.

(56) References Cited

U.S. PATENT DOCUMENTS

| | | | | | |
|---|---|---|---|---|---|
| 5,868,930 | A | * | 2/1999 | Kopf ................... | B01D 63/081 |
| | | | | | 210/488 |
| 2018/0095067 | A1 | * | 4/2018 | Huff ................ | G01N 33/48721 |

FOREIGN PATENT DOCUMENTS

| | | | | | |
|---|---|---|---|---|---|
| CN | 103189122 | A | * | 7/2013 | ............. B01D 71/46 |

OTHER PUBLICATIONS

English Translation of CN-103189122-A (Year: 2013).*

* cited by examiner

*Primary Examiner* — Terry K Cecil
(74) *Attorney, Agent, or Firm* — S.J. INTELLECTUAL PROPERTY LTD.

(57)     ABSTRACT

The embodiments provided herein relate to a water purification system and method utilizing a filter cartridge comprising a plurality of filter wafers stacked to form a plurality of channels for unfiltered water to flow through for purification. The water purification system is configured to utilize the exclusion zone phenomenon to separate impurities from water using hydrophilic surfaces and trifurcations to divert pure water from impurities. The filter cartridge comprising a plurality of filter wafers may be received by a water receptacle to provide a low-energy water purification system.

20 Claims, 8 Drawing Sheets

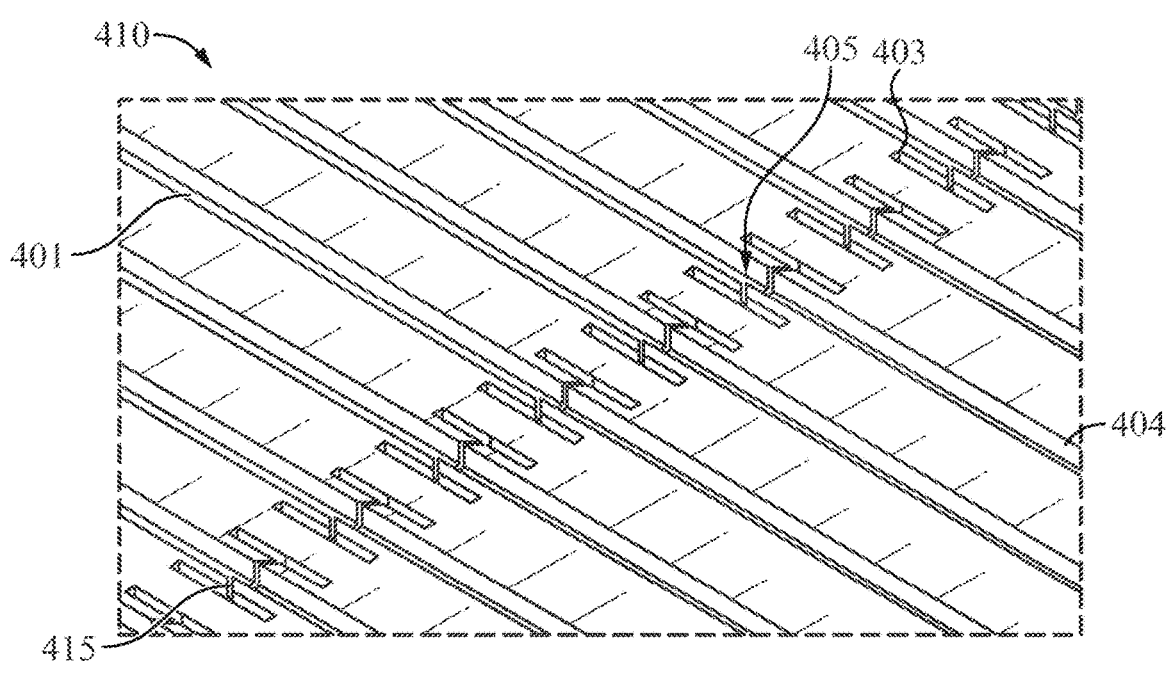
*FIG. 4B*
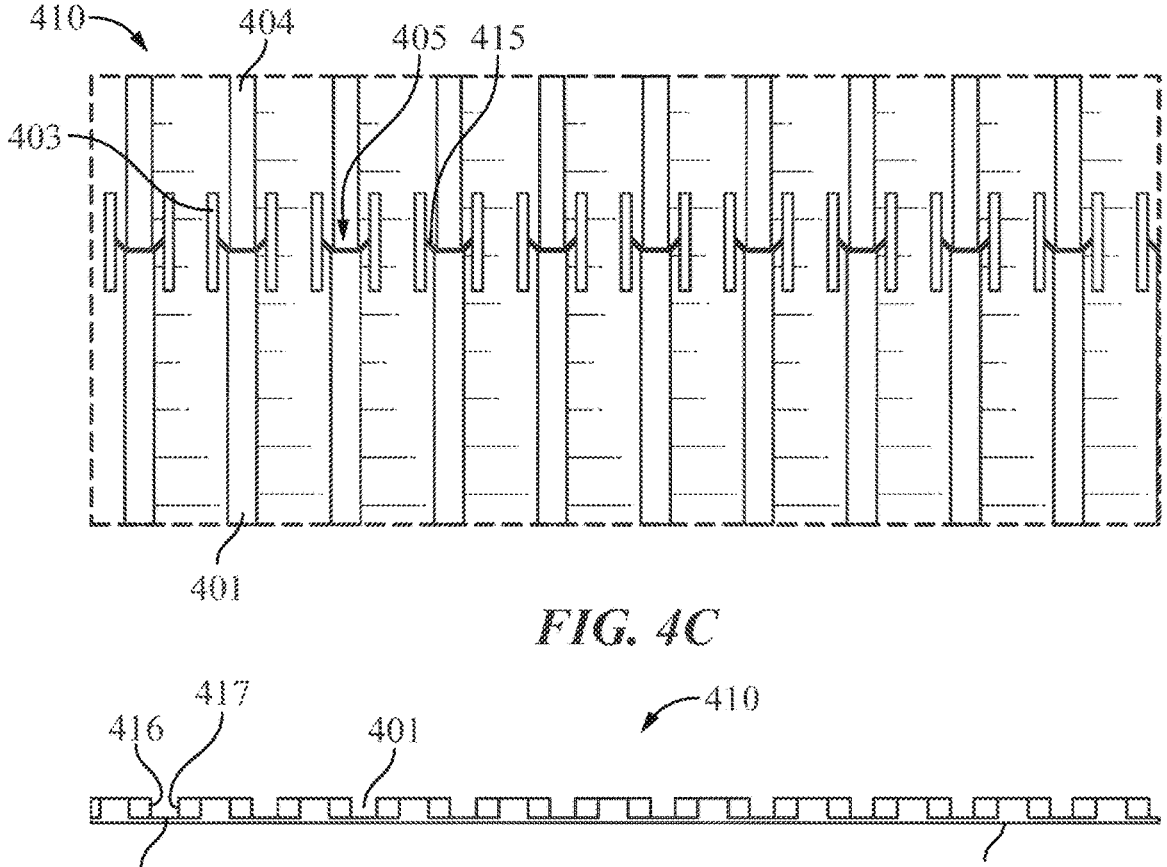
*FIG. 4C*
*FIG. 4D*

WATER PURIFICATION SYSTEM AND METHOD

TECHNICAL FIELD

The present invention is generally related to a water purification system for removing impurities from water.

BACKGROUND

Low-cost, near-zero energy filtration of water for potability that is available to municipalities and the masses may become increasingly important as the population grows and water, as a resource, becomes scarcer. Previous water filtration systems, including reverse osmosis and distillation, require large amounts of energy and/or expensive filters to remove impurities from water. It would be desirable to provide a lower cost, and near zero energy, water filtration system which is affordable for municipalities and the masses. Further, it may be desirable to provide a low-cost, low-energy desalination system, such that the vast amount of water available from the oceans can be tapped into as a water resource without worrying about energy/electricity infrastructure to support the purification functions. Additionally, a system with low or no instances of fouling or which does not require frequent replacement of modules due to clogging would be desirable, and in particular, for desalination purposes so that ocean waters may be relied upon as a fresh water source without worrying about energy infrastructure to support the purification functions, fouling, and constant replacement of modules due to clogging.

Thus, there exists a need for water purification systems that improve upon and advance the design of known water purification systems. Examples of new and useful water purification systems relevant to the needs existing in the field are discussed below.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments provided herein relate to a system and method for water purification. In some embodiments, the system to purify water comprises: a plurality of filter wafers, wherein a filter wafer comprises: a plurality of first channels extending from a proximal end of the filter wafer toward a distal end of the filter wafer, each of the first channels comprising a first sidewall and a second sidewall; and a plurality of trifurcations, wherein a trifurcation is provided at a distal end of each of the first channels, each trifurcation dividing the first channel into a second channel, a third channel, and a fourth channel, wherein the fourth channel is parallel to the first channel, and wherein the second channel and the third channel are provided through a body of the filter wafer, wherein each of the first channel, the second channel, the third channel, and the fourth channel comprise hydrophilic surfaces; and wherein unfiltered water enters the plurality of first channels of the plurality of filter wafers and purified water is diverted from each first channel into the second channel and the third channel.

In some embodiments, the plurality of filter wafers is anodically bonded together to form a filter stack. In some embodiments, the system further comprises a bottom cover provided on a bottom of the filter stack, and wherein the bottom cover comprises a cutout to receive purified water from a plurality of second channels and third channels of the filter stack. In some embodiments, a plurality of the second channels and the third channels of each filter wafer form purified water channels through the filter stack, and wherein the purified water channels run orthogonally relative to the plurality of first channels. In some embodiments, the system further comprises a top cover provided on a top of the filter stack. In some embodiments, the bottom cover and the top cover are anodically bonded to the filter stack to form a filter cartridge. In some embodiments, the plurality of filter wafers, the top cover, and the bottom cover comprise silicon wafers or glass substrates. In some embodiments, the filter stack is hermetically sealed with a hydrophilic adhesive, annealing using sputtered titanium, direct silicon fusion bonding, or thermal compression bonding. In some embodiments, impure water is diverted from the first channel into the fourth channel. In some embodiments, the impure water exits an impure water outlet formed by distal ends of a plurality of the fourth channels. In some embodiments, the trifurcation comprises a first diversion channel in fluid communication with the second channel and a second diversion channel in fluid communication with the third channel.

In some embodiments, the first diversion channel and the second diversion channel each form an angle of 1 to 30 degrees, 30 to 60 degrees, 60 to 90 degrees, 90 to 120 degrees, 120 to 150 degrees, or 150 to 179 degrees, with the first channel depending on the complexity and precisions of the microfabrication technique used. In some embodiments, the first and second diversion channels comprise a width of approximately 1 to 10 microns, 10 to 60 microns, 60 to 100 microns, or 100 to 200 microns depending on the hydrophilic material that is lining the insides of flow channels. In some embodiments, the first channel comprises a width of approximately 200 to 600 microns depending on the width selected for diversion channels. In some embodiments, the fourth channel comprises a width of approximately 140 to 500 microns.

Provided herein are embodiments of a system to purify water, comprising: a plurality of filter wafers, a filter wafer comprising: a plurality of first channels extending from a proximal end of the filter wafer toward a distal end of the filter wafer, each of the first channels comprising a first sidewall and a second sidewall, wherein the first and second sidewalls comprise a hydrophilic surface; and a plurality of trifurcations, wherein a trifurcation is provided at a distal end of each of the first channels, each trifurcation dividing the first channel into a second channel, a third channel, and a fourth channel, wherein the fourth channel is parallel to the first channel, and wherein the second channel and the third channel are provided through a body of the filter wafer, wherein unfiltered water enters the plurality of first channels of the plurality of filter wafers and purified water is diverted from each first channel into the second channel and the third channel; and a water receptacle to receive the plurality of filter wafers and direct the unfiltered water to the plurality of first channels of the plurality of filter wafers.

In some embodiments, the water receptacle provides the unfiltered water to the plurality of first channels at a pressure head of at least 15 cm to 2 meters. In some embodiments, the system further comprises a bottom cover provided on a bottom of the plurality of filter wafers, wherein the bottom cover comprises a cutout providing an outlet for purified water received from a plurality of second channels and third channels, and wherein the outlet is provided outside a body of the water receptacle when the plurality of filter wafers is received by the water receptacle. In some embodiments, the system further comprises a top cover provided on a top of the plurality of filter wafers, wherein the plurality of filter wafers, the bottom cover, and the top cover are anodically bonded to form a filter cartridge, and wherein the water receptacle receives the filter cartridge. In some embodiments, the system further comprises a top cover provided on a top of the plurality of filter wafers, wherein the plurality of filter wafers, the bottom cover, and the top cover are hermetically sealed with a hydrophilic adhesive, or annealing using sputtered titanium, or direct silicon fusion bonding, or thermal compression bonding.

BRIEF DESCRIPTION OF THE DRAWINGS

A more complete understanding of the embodiments, and the attendant advantages and features thereof, will be more readily understood by reference to the following detailed descriptions when considered in conjunction with the accompanying drawings wherein:

FIG. 4B depicts a detailed section view of a filter wafer component of a water filter cartridge, according to some embodiments;

FIG. 4B depicts a detailed section view of a filter wafer component of a water filter cartridge, according to some embodiments;

FIG. 4C depicts a detailed section view of a filter wafer component of a water filter cartridge, according to some embodiments;

FIG. 4D depicts a detailed section view of a filter wafer component of a water filter cartridge, according to some embodiments;

DETAILED DESCRIPTION

Figure 1A:
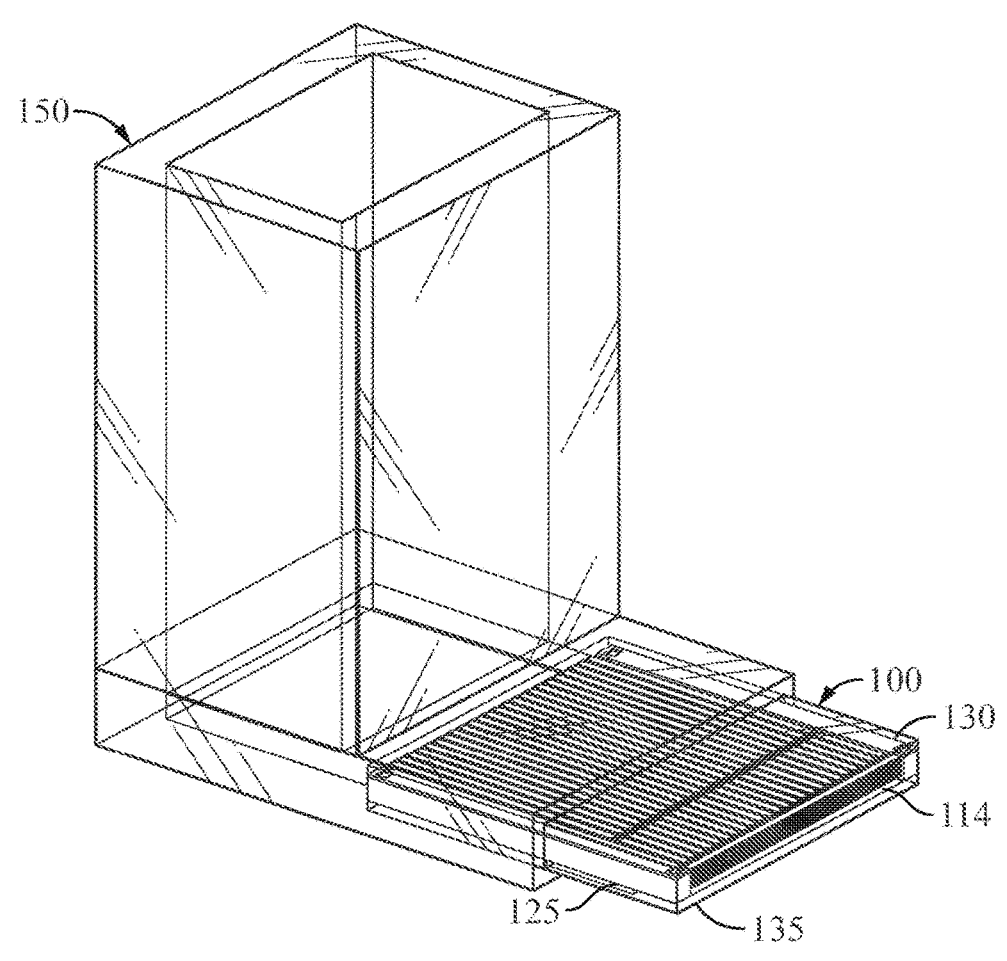
FIG. 1A depicts a perspective view of a water purification system, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a water purification system comprising a water filter cartridge. In some embodiments, the water purification cartridge comprises a plurality of filter wafers which are stacked. The stack of filter wafers may be collectively referred to as a filter cartridge. In some embodiments, the filter cartridge comprises the plurality of filter wafers (forming a stack of filter wafers or a filter stack), a top cover, and a bottom cover.

In some embodiments, each of the filter wafers comprise a plurality of channels. The first channels may also be referred to as inlet channels or unfiltered water channels. In some embodiments, unfiltered water enters a plurality of first channels formed by the plurality of filter wafers. In some embodiments, a plurality of the distal ends of the first channels forms a plurality of inlets. The plurality of inlets may be collectively referred to as the inlet of the filter cartridge.

In some embodiments, the first channels comprise hydrophilic surfaces. As the unfiltered water flows through the first channels, the hydrophilic surfaces form an exclusion zone, in which pure water (i.e., $H_2O$) collects against the hydrophilic surfaces and repels impurities away from the hydrophilic surfaces, thereby stratifying the water in the first channels. In some embodiments, each of the first channels formed in the filter wafers comprises a trifurcation. In some embodiments, due to the exclusion zone created by the hydrophilic surfaces, the water flowing in the first channels is stratified when it reaches the trifurcations. In some embodiments, the trifurcations direct the outer portions of the water flowing through the first channels into second and third channels.

In some embodiments, due to the stratification of pure water caused by hydrophilic surfaces of the first channels, the water entering the second channels and third channels is pure water. The second channels and third channels may therefore be referred to, collectively, as the purified water channels. In some embodiments, the purified water channels run orthogonally to a plane formed by the body of the filter wafers. In some embodiments, when the filter wafers are stacked, purified water channels are formed throughout the stack of filter wafers or filter stack, such that the purified water from each of the filter wafers exits through the bottom of the filter stack. The purified water from each of the purified water channels of the filter stack may be directed to a plurality of outlets. Said outlets may be collectively referred to as purified water outlets of the filter stack. In some embodiments, a bottom cover or base comprises a cutout which collects the purified water exiting the purified water outlets and provides a purified water outlet for the entire filter cartridge comprising the stack of filter wafers.

In some embodiments, a plurality of fourth water channels is provided parallel to the first water channels. In some embodiments, the pure water is diverted from the first channel to the second and third channels (the purified water channels), impurities flow into the fourth channels. The fourth channels may therefore be referred to, collectively, as the dirty water channels or impure water channels. The plurality of impure water channels may form an impure water outlet of the filter cartridge comprising the stack of filter wafers. In some embodiments, impure water from the plurality of impure water channels may be collected and/or diverted from the impure water outlet.

Figure 8A:
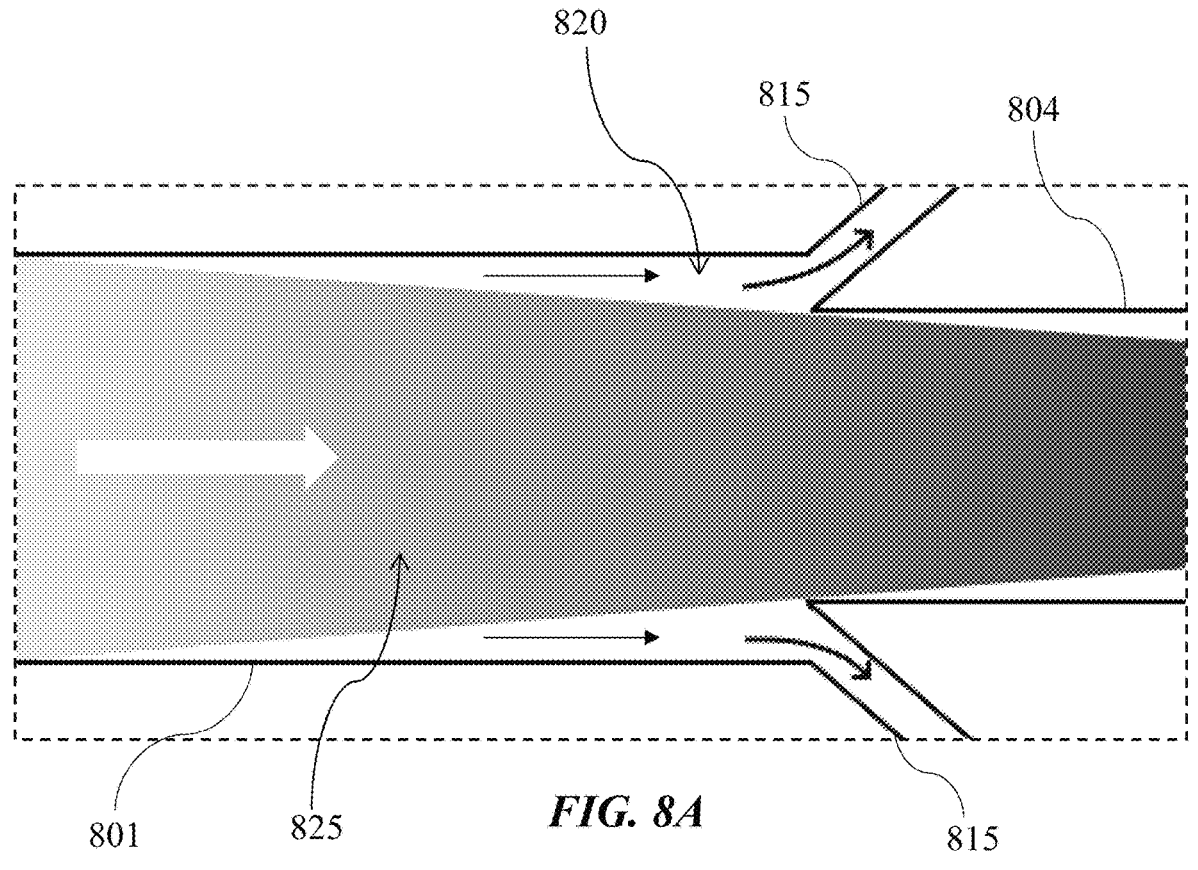
FIG. 8A depicts an exclusion zone forming in a channel of a filter wafer component, according to some embodiments.
Figure 8B:
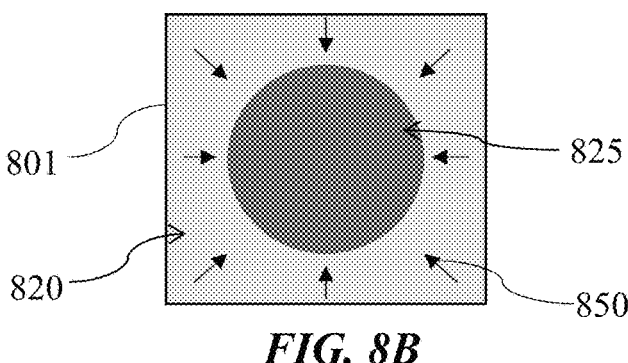
FIG. 8B depicts an exclusion zone forming in a channel of a filter wafer component, according to some embodiments.

FIGS. 8A and 8B depict the separation of pure water from impurities in a channel caused by the exclusion zone phenomena, according to some embodiments. In some embodiments, unfiltered water enters a first channel 801 which comprises hydrophilic inner surfaces. As pure water is drawn to the hydrophilic surfaces, the pure water may repel impurities or particles within the unfiltered water toward the center of the channel. The repelling force 850 created by the exclusion zone phenomena causes solute particles, suspended in the unfiltered water, to be excluded from the vicinity of the hydrophilic inner surfaces, thereby creating a large stratum, and separating the pure water 820 from an aqueous solution with concentrated impurities 825.

As illustrated in FIG. 8A, a trifurcation comprising diversion channels 815 may utilize the exclusion zone phenomena to divert pure water for collection as the unfiltered water with concentrated impurities 825 continues downstream into subsequent channel 804. As described herein, the inner, excluding surfaces of the channel 801 may be formed from or coated with a hydrophilic material to create an exclusion zone wherein pure liquid water is stratified from impurities suspended within the water source.

The purification system described herein may comprise a water receptacle for receiving unpurified water and directing it to the inlet of a filter cartridge. The system may purify utilizing gravity to accomplish the filtration process, thereby providing a low-energy or zero-energy filtration system. One skilled in the art would understand that the filter cartridge described herein could be utilized in a variety of systems, including systems which may utilize pumps adjacent to the inlet and/or outlet of a filter cartridge for specific applications.

The purification system described herein may be utilized to remove various impurities from a water source. For example, the purification system may be utilized to remove salts/saline from ocean water or brackish water sources. In some embodiments, the purification system may be utilized to remove materials from a fresh water source to produce purified water. In some embodiments, the purification system may be utilized to remove dissolved solutes, ions, suspended particles, bacteria, viruses, organic compounds, inorganic compounds, or similar unwanted impurities from a water source. However, the purification system may be limited in its ability to remove certain toxins or toxic compounds that may potentially collapse the exclusion zones responsible for purification.

Water Filtration System

Figure 1B:
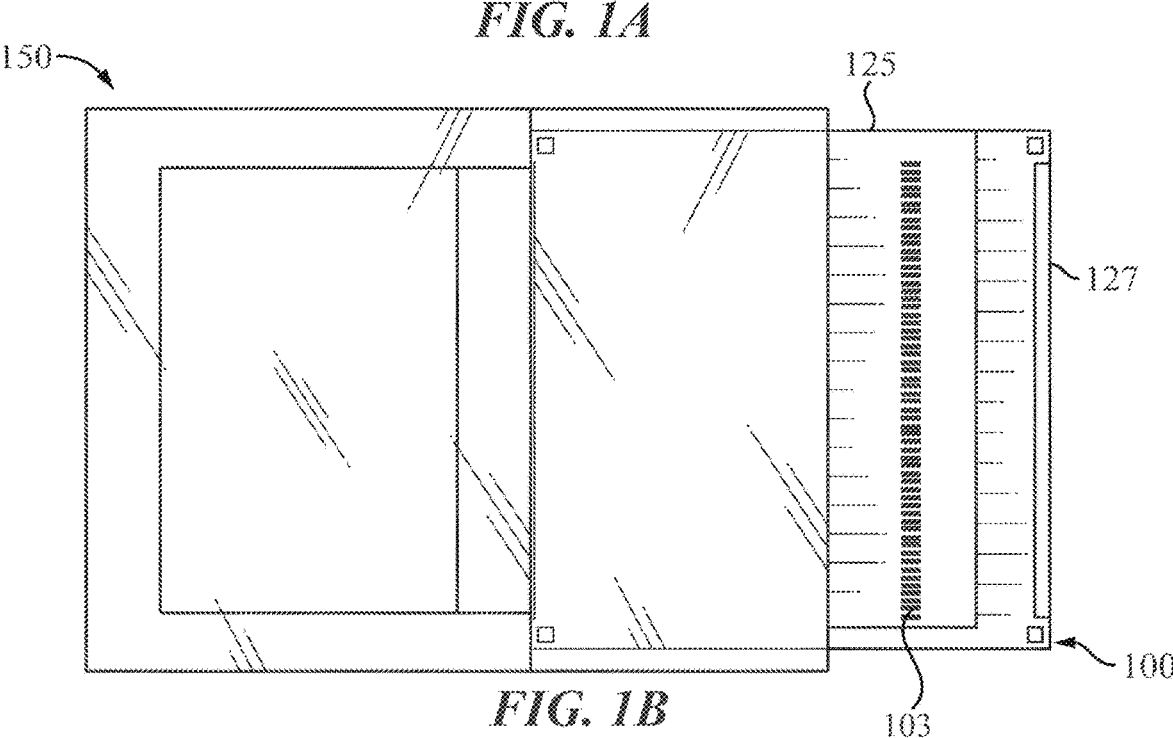
FIG. 1B depicts a bottom view of a water purification system, according to some embodiments.
Figure 1C:
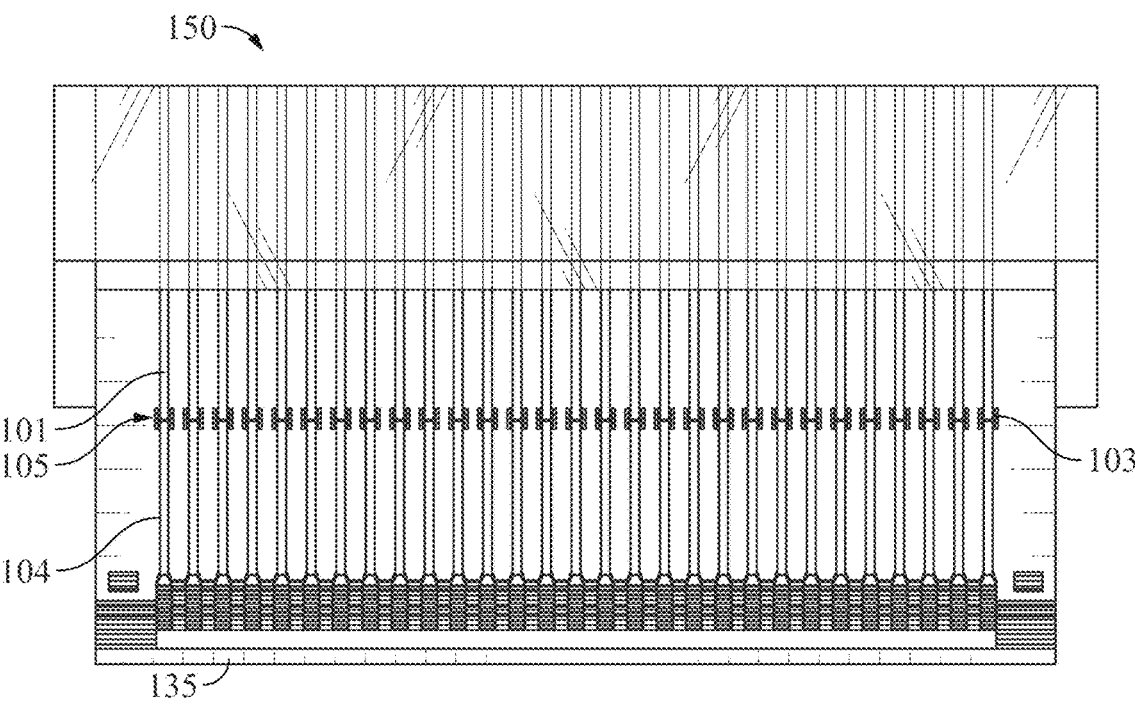
FIG. 1C depicts a top perspective of a water purification system, according to some embodiments.

FIGS. 1A-1C depict a water filtration system, according to some embodiments. In some embodiments, the water filtration system comprises an unpurified water receptacle 150 and a water filter cartridge 100. The water receptacle 150 may receive a volume of unpurified water. In some embodiments, the water receptacle 150 receives a filter cartridge 100 and directs the unfiltered water to an inlet of a water filter cartridge 100 for purification. The water receptacle 150 provides a necessary water pressure head such water can be forced through the filter cartridge 100 under the influence of gravity and without any additional pumps or energy input.

In some embodiments, the filter cartridge 100 comprises one or more filter wafers, and each filter wafer comprises a plurality of first channels 101 directing the unfiltered water to trifurcations 105, as further described herein. The proximal ends (depicted as 411 in FIG. 4A) of the first channels 101 may form inlets for the unfiltered water to enter filter cartridge 100. The plurality of inlets formed by the proximal ends of the first channels 101 may be collectively referred to as an inlet of the filter cartridge 100.

Figure 2:
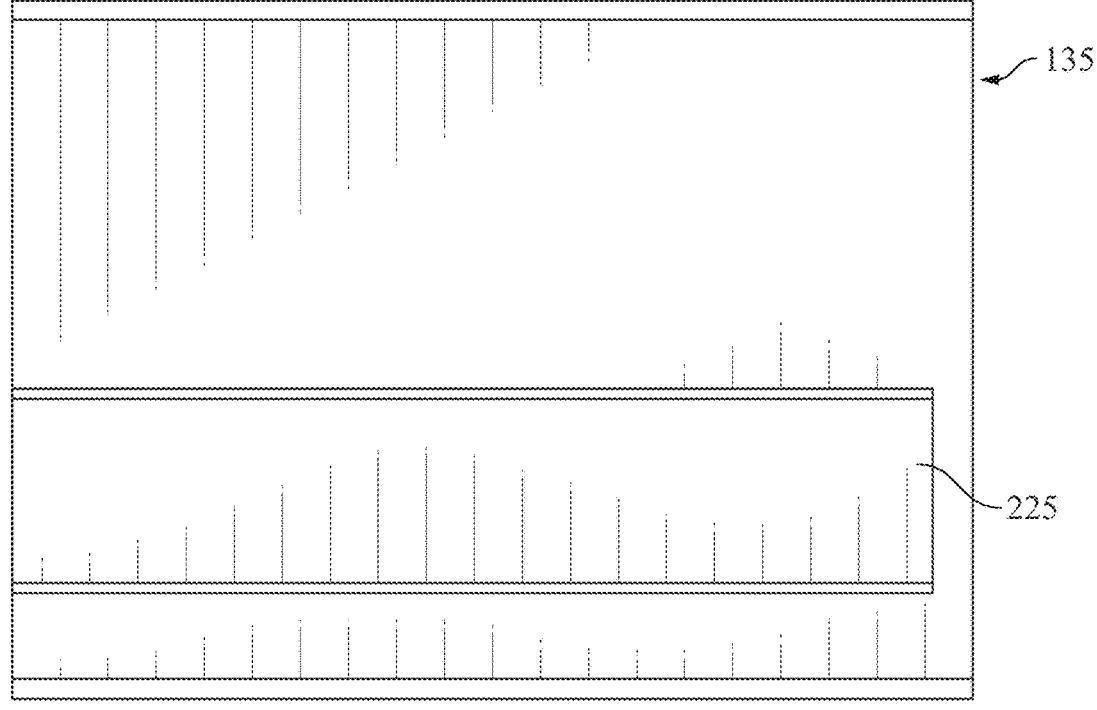
FIG. 2 depicts a top perspective view of a bottom cover component of a water filter cartridge, according to some embodiments.

The plurality of first channels 101 may comprise hydrophilic surfaces, such that the unfiltered water becomes stratified prior to reaching trifurcations 105. The trifurcations 105 may direct pure water through purified water channels 103 running orthogonally relative to a plane formed by the stack of wafer filters and into a purified water outlet 125 formed by a cutout (depicted in FIG. 2 as 225) in the bottom cover 135 of the filter cartridge 100.

In some embodiments, the trifurcations 105 lead water with concentrated impurities into impure water channels 104 running parallel to the unfiltered water channels 101. The water with concentrated impurities may exit from the distal end of the filter cartridge from the distal ends of the impure water channels 104. The distal ends of the impure water channels 104 may be collectively referred to as the impure water outlet 114 of the filter cartridge 100.

FIG. 1B depicts a bottom view of the water receptacle 150 with the filter cartridge 100 received within a cavity of the water receptacle 150, according to some embodiments. When received by the water receptacle 150, the purified water channels 103 and purified water outlet 125 may be provided outside of the body of the water receptacle 150, thereby preventing impedance of the flow of purified water from the filter cartridge 100.

FIG. 1C depicts a top perspective view of the water receptacle 150 with the filter cartridge 100 received within a cavity of the water receptacle 150 and having the top cover (130 as depicted in FIG. 1A) removed, according to some embodiments. FIG. 1C further shows trifurcations 105 and inlets for the purified water channels 103 positioned outside of the body of the water receptacle 150, thereby preventing impedance of the flow of purified water from the filter cartridge 100, according to some embodiments.

Filter Cartridge

FIGS. 3A-3D depict a filter cartridge 300, according to some embodiments. In some embodiments, the filter cartridge 300 comprises a stack of filter wafers 310, a top cover 330, and a bottom cover 335. In some embodiments, the filter wafers 310 are anodically bonded together to form a hermetic seal. A hermetic seal may also be achieved through several other processes, including, but not limited to, sputtering a wafer surface with titanium and thermal bonding under pressure; using a hermetically sealed adhesive to bond the wafers, such as spin coating; silicon fusion bonding; or thermal compression bonding. In some embodiments, the top cover 330 and/or bottom cover 335 are anodically bonded to the top and bottom, respectively, of the stack of filter wafers 310. In some embodiments, a hermetic seal may be formed by annealing. Annealing may include sputtering surfaces of the filter wafers 310, and/or the top and bottom covers, with titanium and thermal bonding the filter wafers together under pressure. In some embodiments, a hermetic seal may be formed by coating and bonding the filter wafers, and/or the top and bottom covers, together with a hydrophilic adhesive such as sulfonated tetrafluoroethylene-based fluoropolymer-copolymers (e.g., NAFION), wafer bonding adhesives (e.g., PERMINEX), other suitable adhesives, or combinations thereof. The sealing adhesive may be spin coated onto the filter wafers. A hermetic seal may also be achieved by silicon fusion bonding, thermal compression bonding, other suitable bonding methods, or combinations thereof.

Figures 3A, 3B, 3C:
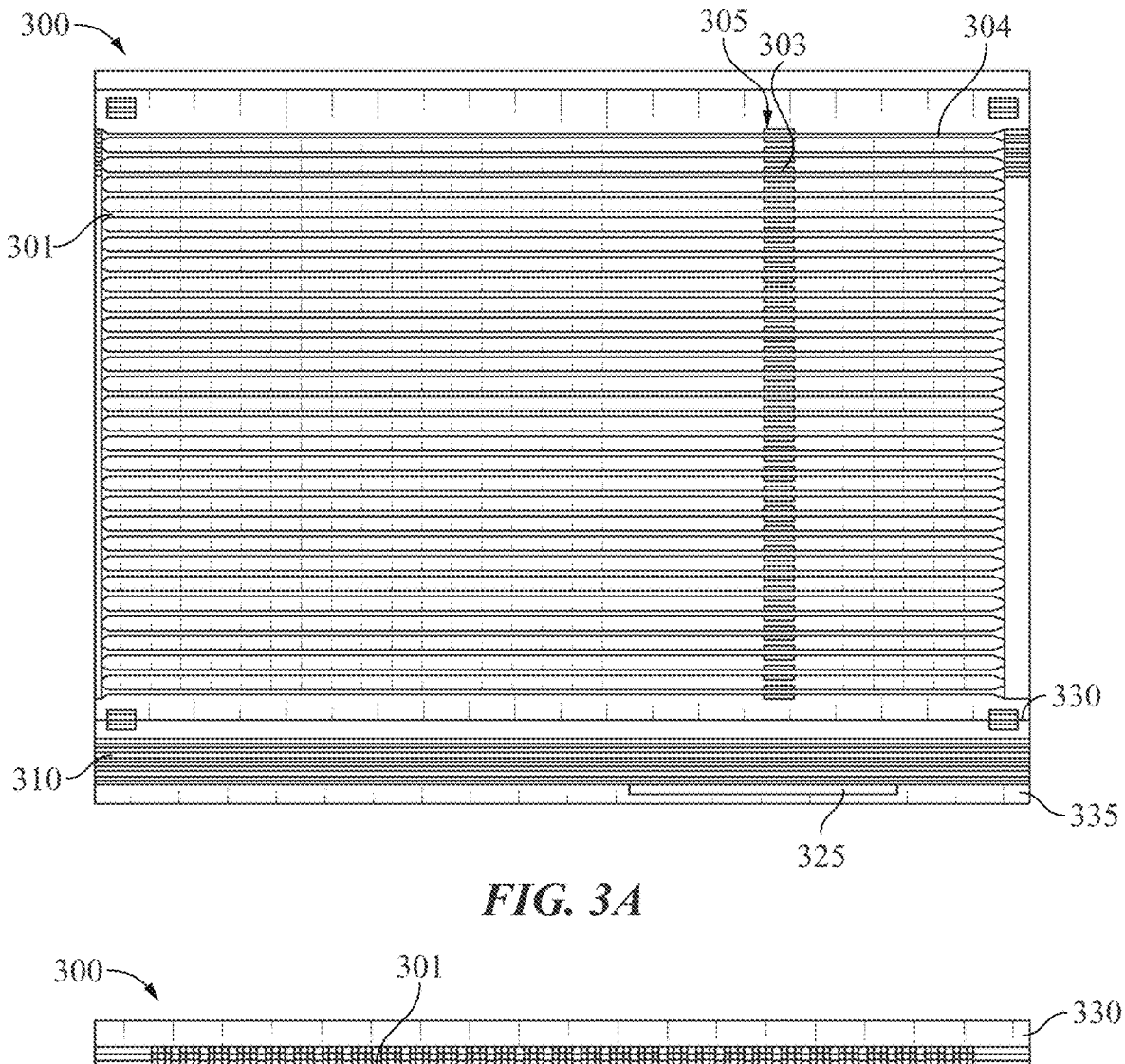
FIG. 3A depicts a top perspective view of a water filter cartridge, according to some embodiments.
FIG. 3B depicts a rear view of a water filter cartridge, according to some embodiments.
FIG. 3C depicts a front view of a water filter cartridge, according to some embodiments.
Figure 3D:
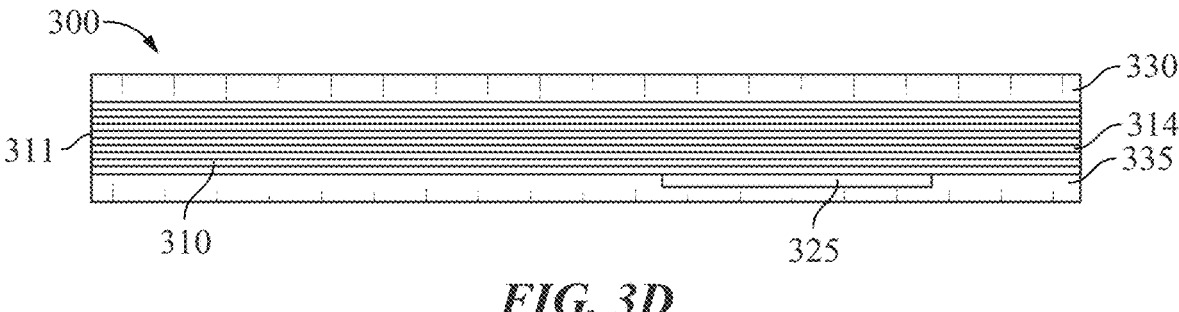
FIG. 3D depicts a left side view of a water filter cartridge, according to some embodiments.

FIG. 3B depicts a rear view of the filter cartridge 300 and shows the inlets of the first channels 301 (the unfiltered water channels) which collectively form an unfiltered water inlet of the filter cartridge, according to some embodiments. FIG. 3C depicts a front view of the filter cartridge 300 and shows the outlets of the fourth channels 304 (impure water channels) which collectively form an impure water outlet of the filter cartridge, according to some embodiments. FIG. 3D depicts a left-side view of the filter cartridge 300 and shows the purified water outlet 325 of the water filter cartridge 300. With reference to FIG. 3D, unfiltered water will flow from left to right, entering an unfiltered water inlet 311 formed by the proximal ends of the first channels and towards the trifurcations, according to some embodiments. With further reference to FIG. 3D, after separation of pure water from impurities at the trifurcations, impure water will exit an impure water outlet 314 formed by the distal ends of the fourth channels and purified water will flow out the purified water outlet 325 provided by the bottom cover 335.

With reference to FIG. 3A, a perspective view of the filter cartridge 300 is depicted, according to some embodiments. In some embodiments, unfiltered water enters the plurality of first channels 301 provided in each of the filter wafers 310. Water may be urged into the channels by a pressure head (e.g., a pressure head provided by a water receptacle as described herein), hydrophilic surfaces of the first channels, or a combination thereof. As depicted in FIG. 3A, the unfiltered water flows from the first channels towards the trifurcations 305 (from left to right).

As described herein, one or more surfaces of the first channels 301 are hydrophilic and the unfiltered water is stratified by the exclusion zone phenomenon as the unfiltered water flows through the first channels 301. The stratification caused by the hydrophilic surfaces causes pure water to accumulate against the hydrophilic surfaces (on the outside of the first channels) and repels impurities away from the hydrophilic surfaces (toward the center of the first channels). In some embodiments, the unfiltered water flows towards the trifurcations 305 wherein purified water, which has accumulated toward the outside of the first channels, is diverted into purified water channels 303 while concentrated impurities continue into the impure water channels 304.

In some embodiments, stacking and/or bonding of the filter wafers 310 provides continuous purified water channels 303 which run through the stack of filter wafers. The purified water from each of the filter wafers may then flow into a cutout (depicted in FIG. 2 as 225) provided in the bottom cover 335 of the filter cartridge 300 and out the purified water outlet 325.

In some embodiments, stacking of the filter wafers 310 allows for a modular construction, such that specific flow rate requirements can be met while remaining as cost-effective as possible. For example, a user requiring a higher volume of filtered water production could utilize a filter cartridge 300 comprising twenty or more filter wafers 310, while a user requiring a lower volume of filtered water production could utilize a filter cartridge 300 comprising ten filter wafers. An increase in water production requirements may simply require a greater number of wafer filters without any further changes to the filter cartridge, therefore providing a cost-effective solution to meet custom water filtration requirements. Further, the width of the filter wafers may be increased to increase the number of channels running through each filter wafer for increased water filtration rates.

In some embodiments, as depicted herein, a water receptacle may be provided to receive a filter cartridge 300 and provide a pressure head at the inlet of the filter cartridge such that filtration is carried out under the influence of gravity. Further, the filter cartridge design could be applied in a variety of scenarios with various water inlets and/or outlets being utilized. For example, a manifold could connect the inlet 311 of the filter cartridge to a pipe providing a pressurized water source. Further manifolds could also be utilized to connect, for example, the purified water outlet 325 to a pipe to divert purified water to a tank or outlet away from the filter cartridge. Similarly, a manifold may connect the impure water outlet 314 to a pipe to divert impure water away from the filter cartridge for disposal. According to some embodiments, filter cartridges may be used in a cascading system in which impure water from a first cartridge may be diverted into a second cartridge to increase extracted pure water.

In some embodiments, the filter wafers 310, the top cover 330, and the bottom cover 335 comprise silicon wafers. The silicon wafers may be utilized for simple microfabrication using laser cutting (e.g., laser etching or laser ablation which may be carried out using a laser computerized numerical control (CNC) system), deep reactive ion etching, and/or time-multiplexed etching (e.g., Bosch processing). In some embodiments, the simple microfabrication process may include a deep reactive ion etching and/or a batch process. In some embodiments, other materials may be utilized to form the filter wafers 310, the top cover 330, and the bottom cover 335, including but not limited to metals, plastics/polymers, glass, or other materials which may be suitable for microfabrication or the fabrication of the channels of the filter wafers.

In some embodiments, the filter wafers 310, the top cover 330, and/or the bottom cover 335 comprise a hydrophilic material. In some embodiments, the filter wafers 310, the top cover 330, and/or the bottom cover 335 are manufactured from a hydrophilic material. In some embodiments, the filter wafers 310, the top cover 330, and/or the bottom cover 335 comprise a hydrophilic coating. The hydrophilic coating may comprise sulfonated tetrafluoroethylene-based fluoropolymer-copolymers (e.g., NAFION), hydrophilic silicon dioxide, polyacrylic-acid gels, hydrogels, hydrophilic polymeric surfaces, ACULON hydrophilic coatings, carbon nanoparticles hydrolyzed in an alkaline environment, other materials suitable for providing a hydrophilic coating, or combinations thereof. A hydrophilic coating may be applied with spin coating, micro-imprinting, physical vapor deposition, or combinations thereof. In some embodiments, only portions of the filter wafers 310, the top cover 330, and/or the bottom cover 335 comprise a hydrophilic coating. The hydrophilic coating may be applied to a filter wafer after fabrication of the channels.

According to some embodiments, the filter wafers may be naturally hydrophilic on the surface or can be made hydrophilic by deposition of materials like nafion, hydrophilic silicon dioxide, aculon, or carbon nano-particles hydrolysed in an alkaline environment. Such materials could be applied with spin coating, micro-imprinting, or physical vapor deposition.

Filter Wafers

FIGS. 4A-4D, depict a filter wafer 410, according to some embodiments. As described herein, a plurality of filter wafers 410 may be stacked to form a portion of a filter cartridge. In some embodiments, the unfiltered water channels 401, trifurcations 405, and impure water channels 404 are formed in top surface of each filter wafer 410. In some embodiments, the purified water channels 403 are formed through the body of each filter wafer 410. The purified water channels may also be referred to as through-holes, cutouts, apertures, or vias if the base material is silicon. In some embodiments, wherein the filter wafers 410 are comprised of silicon, the purified water channels may be referred to as through silicon vias. In some embodiments, the purified water channels run orthogonally through a plane created by the body of the filter wafer 410 (i.e., through the thickness of the filter wafer).

When stacked, the bottom surface of a first filter wafer may form the top surface of the unfiltered water channels and the impure water channels of a filter wafer of a second filter wafer provided directly below the first filter wafer. Further, when stacked, the purified water channels 403 of all the filter wafers of the stack may form continuous channels through the entire stack (i.e., continuous channels running from the top filter wafer of the stack to the bottom filter wafer of the stack). In some embodiments, the filter wafers of a filter cartridge are anodically bonded together to form a hermetic seal. A hermetic seal can also be achieved with several other processes, including, but not limited to sputtering a wafer surface with titanium and thermal bonding under pressure, called annealing; using a hermetically sealing adhesive to bond the wafers like spin coating nafion, perminex, or the like; silicon fusion bonding; or thermal compression bonding.

In some embodiments, a hermetic seal may be formed by annealing. Annealing may include sputtering surfaces of the filter wafers 410 with titanium and thermal bonding the filter wafers together under pressure. In some embodiments, a hermetic seal may be formed by coating and bonding the filter wafers, and/or the top and bottom covers, together with a sealing adhesive such as sulfonated tetrafluoroethylene-based fluoropolymer-copolymers (e.g., NAFION), wafer bonding adhesives (e.g., PERMINEX), other suitable adhesives, or combinations thereof. The sealing adhesive may be spin coated onto the filter wafers. A hermetic seal may also be achieved by silicon fusion bonding, thermal compression bonding, other suitable bonding methods, or combinations thereof.

In some embodiments, each filter wafer 410 comprises a plurality of first channels or unfiltered water channels 401 to receive unfiltered water. In some embodiments, the unfiltered water flows in the first channels 401 towards the trifurcations 405 wherein purified water, which has accumulated toward the outside of the first channels due to the exclusion zone phenomena created by the hydrophilic surfaces of the first channels, is diverted into purified water channels 403 while concentrated impurities continue into the impure water channels 404.

Figure 4A:
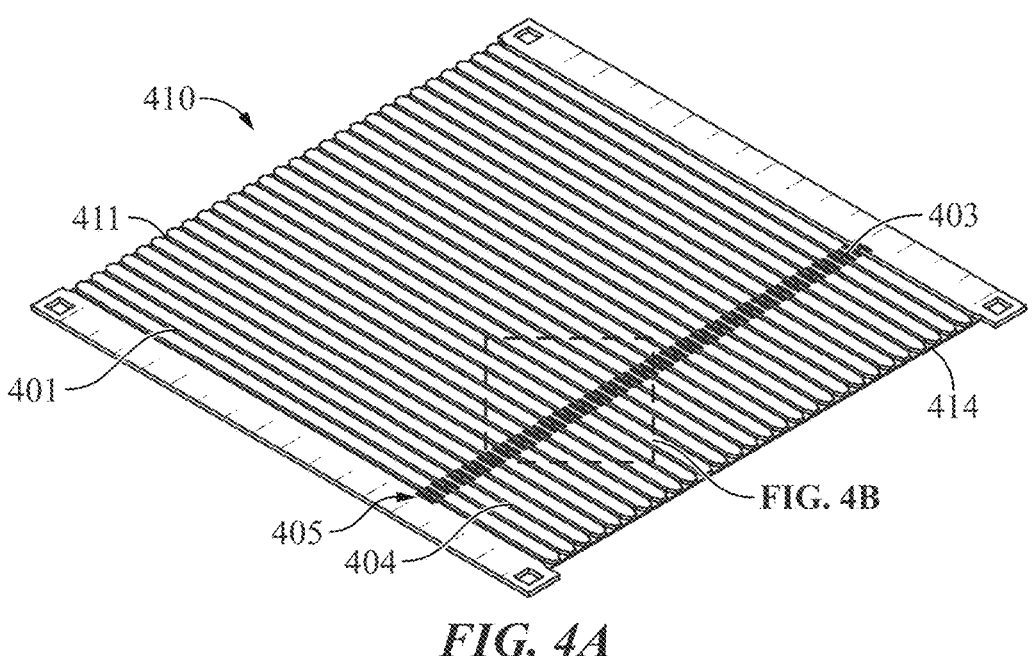
FIG. 4A depicts a top perspective view of a filter wafer component of a water filter cartridge, according to some embodiments.

With reference to FIG. 4A, the proximal ends 411 of the unfiltered water channels 401 may be tapered to form an inlet into channels. In some embodiments, the taper at the proximal end 411 increases capillary forces to pull the water into the first channels 401. In some embodiments, the distal ends 414 of each of the impure water channels 404 comprise a taper.

With reference to FIGS. 4B and 4C, detailed views of a filter wafer 410 are depicted showing the trifurcations 405. In some embodiments, a distal end of each unfiltered water channel 401 leads to or terminates at a trifurcation 405. In some embodiments, the trifurcation 405 comprises pure water diversion channels 415. In some embodiments, a first diversion channel diverts water to the second channel (a purified water channel) and a second diversion channel diverts water to the third channel (another purified water channel). As described herein, hydrophilic surfaces provided in the unfiltered water channels 401 stratify the unfiltered water such that pure water accumulates on the outside of the unfiltered water channels and impurities in the unfiltered water are pushed to the center of the channels. The diversion channels 415 divert the pure water from the outside of the unfiltered water channel and into the purified water channels. Impurities, collected toward the center of the unfiltered water channel, may then flow into the impure water channel 404. Therefore, each trifurcation may serve to separate purified water from water with concentrated impurities.

In some embodiments, the diversion channels 415 form 45° angle with the unfiltered water channels 401. In some embodiments, the diversion channels 415 form an angle with the unfiltered water channels 401 of about 15 degrees to about 30 degrees, about 30 degrees to about 45 degrees, or about 45 degrees to about 60 degrees. Depending on the precision of the microfabrication tool, this angle can also be 1 to 15 degrees, 60 to 90 degrees, 90 to 120 degrees, 120 to 150 degrees, or 150 to 179 degrees. In some embodiments, the trifurcations provide a narrowing of the unfiltered water channels 401 relative to the impure water channels 404, such that the width of the impure water channels 404 is less than the width of the unfiltered water channels 401.

FIG. 4D depicts a detailed rear view of a filter wafer 410. In some embodiments, each first channel 401 of the filter wafer comprises a bottom wall 418, a first sidewall 416, and a second sidewall 417. In some embodiments, when stacked, the bottom surface 419 of a first filter wafer forms a top surface or top wall for each of the first channels of a second wafer stacked directly below the first filter wafer. Similarly, each fourth channel of the filter wafer comprises a bottom wall, a first sidewall, a second sidewall and a top wall (formed by the bottom surface of the wafer directly above). The bottom wall, first sidewall, second sidewall, and a top wall may be collectively referred to as the walls or inside surfaces of the channel. In some embodiments, the top cover of a filter cartridge provides a top surface or top wall for the filter wafer at the top of a filter stack.

In some embodiments, each filter wafer is comprised of a hydrophilic material. In some embodiments, a hydrophilic coating is applied to the entire filter wafer. In some embodiments, hydrophilic coating is applied to portions of each filter wafer. In some embodiments, the hydrophilic coating is applied to the walls or inner surfaces of each channel (i.e., the walls which form the first channels, second channels, third channels, fourth channels, and the diversion channels). The hydrophilic coating may comprise sulfonated tetrafluoroethylene-based fluoropolymer-copolymers (e.g., NAFION), hydrophilic silicon dioxide, polyacrylic-acid gels, hydrogels, hydrophilic polymeric surfaces, ACULON hydrophilic coatings, carbon nanoparticles hydrolyzed in an alkaline environment, polyvinylpyrrolidone (PVP), polyurethane, polyacrylic acid (PAA), polyethylene oxide (PEO), polysaccharide materials, hydrophilic silicon dioxide (e.g., silicon dioxide developed by wet thermal oxidation of silicon wafer), other materials suitable for providing a hydrophilic coating, or combinations thereof.

In some embodiments, the filter wafers are comprised of silicon wafers and deep reactive ion etching is utilized to pattern the channels in the silicon wafers. In some embodiments, wet thermal oxidation is then carried out on the silicon wafers after fabrication of the channels. In some embodiments, titanium is then sputtered on the backside of each patterned wafer. The filter wafers may then be bonded together with thermal annealing (high temperature and pressure). Dicing may then be carried out to get rid of excess circular geometry from the original silicon wafer form. In some embodiments, NAFION or other hydrophilic hermetically sealing adhesives may be utilized instead of titanium. In some embodiments, the channels are fabricated using laser micromachining. In some embodiments, filter wafers comprising silicon wafers are bonded together utilizing silicon fusion bonding. After bonding wet oxidation or physical vapor deposition of a hydrophilic compound may be carried out on the bonded wafers.

In some embodiments, the filter wafers comprise glass and the channels are formed by hydrofluoric acid (HF) etching. The glass filter wafers may then be subjected to anodic bonding.

In some embodiments, alternating p-type and n-type wafers are utilized to form the wafer stack and anodic bonding is carried out to bond the wafers together. After bonding, wet oxidation or physical vapor deposition of hydrophilic material may be performed.

While examples herein include trifurcations to separate pure water from impurities in an unfiltered water supply, a bifurcation could also be implemented, wherein pure water is diverted from each unfiltered water channel by a single diversion channel into a purified water channel instead of utilizing two diversion channels on each side of the unfiltered water channel.

EXEMPLARY EMBODIMENTS

The following examples are included for illustrative purposes only and are not intended to limit the scope of the present subject matter.

Exemplary Water Receptacle

Figure 5:
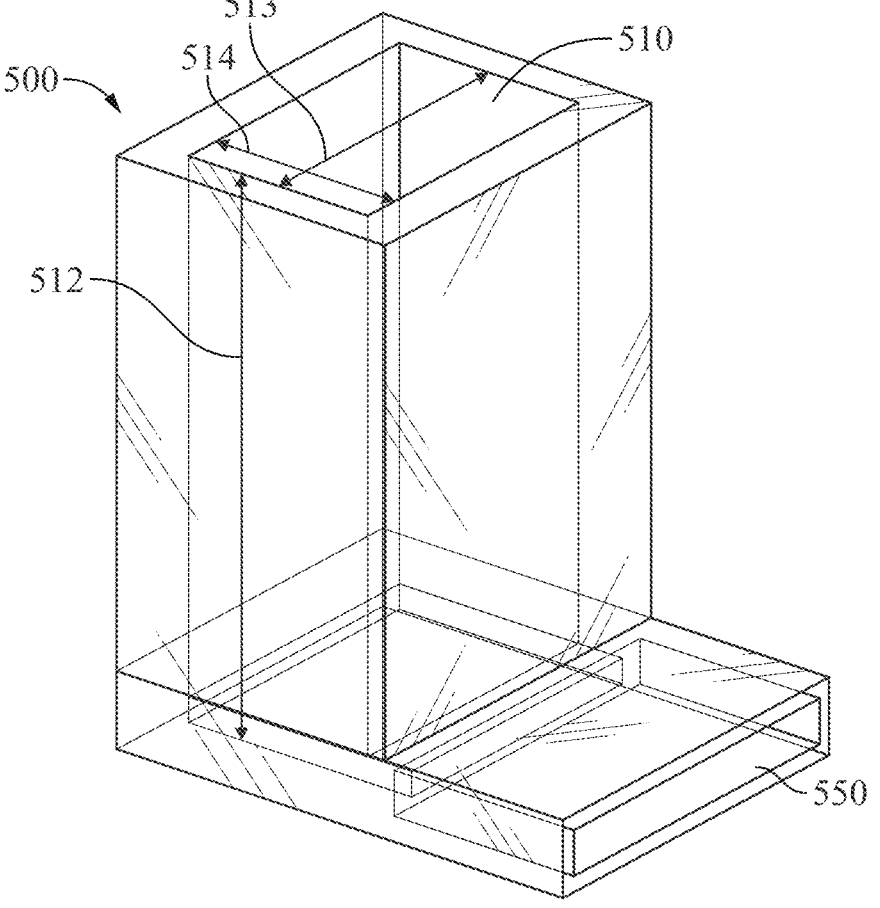
FIG. 5 depicts a perspective view of an unfiltered water receptacle component of a water purification system, according to some embodiments.

FIG. 5. depicts an exemplary water receptacle 500, according to some embodiments. In some embodiments, the water receptacle 500 comprises an unfiltered water inlet 510 for receiving unfiltered water. In some embodiments, the water receptacle 500 is configured to provide a pressure head great enough to move the unfiltered water through a filter cartridge (not shown in FIG. 5) received within a filter cartridge compartment 550 using only the influence of gravity and without any supplementary pumps or energy inputs. In some embodiments, the water inlet 510 comprises a height 512 of approximately 15 cm to 2 meters, or may be variable, a width 513 of approximately 7 cm, or equal to the width of the filter cartridge received by the water receptacle, and a length 514 of approximately 4 cm or more depending on the capacity of the inlet receptacle. In some embodiments, the water receptacle 500 provides a pressure head of approximately 15 centimeters to 2 meters to an inlet of the filter cartridge compartment 550.

In some embodiments, the filter cartridge compartment 550 is sized such that the purified water output of the filter cartridge resides outside of the body of the water receptacle 500, such that the water receptacle does not impede the flow of purified water from the purified water output. In some embodiments, the water receptacle 500, water inlet 510, and filter cartridge compartment 550 are sized to accommodate the exemplary filter cartridge as described herein. The size of the water receptacle 500, water inlet 510, and filter cartridge compartment 550 may be adjusted according to flow rate requirements (i.e., the required amount of filtered water needed per unit of time).

In some embodiments, the water receptacle 500 comprises silicone. In some embodiments, the water receptacle 500 is comprised of any suitable material, including, but not limited to, plastics (e.g., polyethylene or polypropylene), glass, stainless steel, and combinations thereof.

Exemplary Filter Cartridge

FIGS. 3A to 3D depict an exemplary water filter cartridge 300 according to some embodiments. In some embodiments, the filter cartridge 300 comprises a length of about 7 cm and a width of about 7 cm width. In some embodiments, the filter cartridge comprises ten filter wafers 310. Each filter wafer 310 may comprise a thickness of approximately 0.5 mm to 1 mm, and a stack of ten filter wafers would form a stack having a height of 5 mm to 10 mm. In some embodiments, the top cover 330 and the bottom cover of the filter cartridge 300 each comprise a thickness of about 1 mm to 2 mm and have a width and length of about 7 cm to 20 cm. In some embodiments, wherein silicon wafers are used to form the filter wafers, the length and width of the filter wafers, and corresponding top and bottom covers, depend on the size of the silicon wafer the filter wafers are manufactured from. For example, a 4-inch or 100 mm diameter silicon wafer may produce a filter wafer having a length and width of 7 cm, a 6-inch diameter silicon wafer may produce a filter wafer having a length and width of 10 cm, an 8-inch diameter silicon wafer may produce a filter wafer having a length and width of 13 cm, and a 12-inch diameter silicon wafer may produce a filter wafer having a length and width of 20 cm. In an exemplary embodiment, the height of and assembled filter cartridge 300, including ten filter wafers 310, a top cover 330, and a bottom cover 335, comprises a height of about 7 to 14 mm. Rectangular substrates may also be formed. If glass substrates are used, they may have larger dimensions than those previously described. Longer lengths may be desirable to provide more stratification in a cascaded design where in a single channel can have multiple trifurcation.

In some embodiments, a cutout in the bottom cover 335 which forms the purified water outlet is about 20 mm wide and 0.5 to 1 mm deep. In some embodiments, a cutout in the bottom cover 335 which forms the purified water outlet is half the thickness of the cover. The cutout may be disposed directly under the plurality of purified water channels of a stack of filter wafers.

Exemplary Filter Wafer

FIGS. 4A to 4D depict an exemplary water filter wafer 410 according to some embodiments. In some embodiments, a water filter wafer comprises a width of about 7 cm, a length of about 7 cm, and a thickness of about 0.5 mm. In some embodiments, each first water channel or unfiltered water channel 401 of the wafer is about 200 to 600 micrometers (μm or microns) wide (i.e., the separation between the first sidewall 416 and second sidewall 417 of each unfiltered channel is about 200 to 600 microns). In some embodiments, each unfiltered water channel 401 is about 100 to 500 microns deep pending on the thickness and stability of the substrate and substrate material used period.

In some embodiments, the trifurcations 405 and diversion channels 415 are provided about 4 to 6 cm from the proximal ends 411 of the first channels 401. In some embodiments, the diversion channels 415 form an angle of about 1 to 30 degrees, 30 to 60 degrees, 60 to 90 degrees, 90 to 120 degrees, 120 to 150 degrees, or 150 to 179 degrees, with the first channel depending on the complexity and precisions of the microfabrication technique used. In some embodiments, the diversion channels 415 comprise a width of approximately 1 to 10 microns, 10 to 60 microns, 60 to 100 microns, or 100 to 200 microns depending on the hydrophilic material that is lining the insides of flow channels. In some embodiments, the purified water channels 403 comprise a width of approximately 1 to 10 microns, 10 to 60 microns, 60 to 100 microns, or 100 to 200 microns depending on the hydrophilic material that is lining the insides of flow channels and a length of approximately 1 to 2 mm. In some embodiments, the impure water channels or fourth channels 404 are approximately 140 to 500 microns wide depending on the combination of the width of the trifurcation channel, potency of the hydrophilic material, and desired flow rate. The impure water channels 404 may run parallel to and share the same center axis as the associated unfiltered water channels 401. According to some embodiments, all surfaces within a channel exposed directly to the flow of fluid may be hydrophilic including, top, bottom, and side walls.

Cascading Trifurcation Configurations

In some embodiments, a filter wafer comprises a plurality of unfiltered water channels which direct unfiltered water to multiple trifurcations, wherein the exclusion zone phenomenon is utilized to separate pure water from impurities at each trifurcation. As pure water is diverted at each trifurcation, the amount of pure water extracted from a volume of unfiltered water may be increased without having to greatly increase the size of the filter wafers or filter cartridge.

Figure 6:
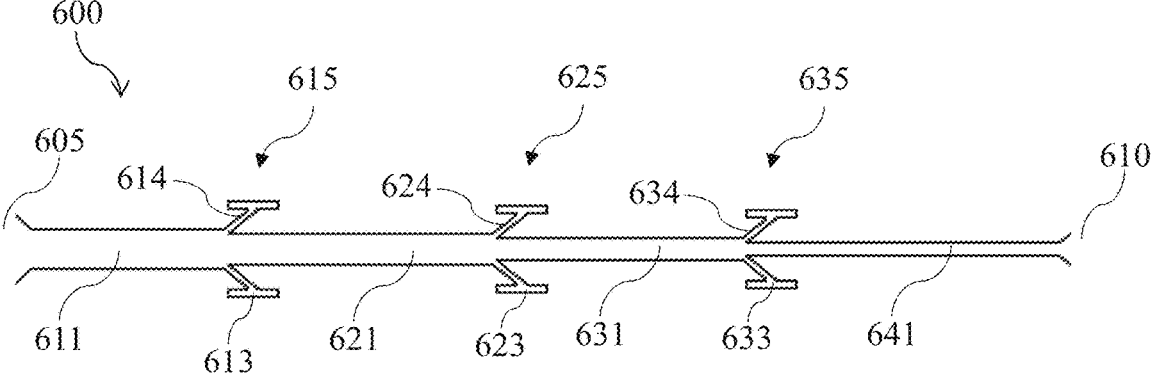
FIG. 6 depicts a serial channel configuration of a filter wafer component, according to some embodiments.

FIG. 6 depicts an example of a cascading trifurcation configuration wherein three trifurcations (615, 625, 635) are provided in a series arrangement along a track 600. In some embodiments, unfiltered water enters a water inlet 605 and into a first channel 611. As described herein, the first channel may comprise inner surfaces comprised of a hydrophilic material, such that pure water is separated from impurities as the unfiltered water moves through the channel. In some embodiments, as the water reaches the first trifurcation 615, pure water is diverted by first diversion channels 614 into first pure water channels 613, as described herein. In some embodiments, water with impurities continues into a second channel 621. The second channel may also comprise inner surfaces comprised of a hydrophilic material, such that pure water is separated from impurities as the unfiltered water moves through the second channel. When the water reaches a second trifurcation 624 pure water is diverted by second diversion channels 624 into a second set of pure water channels 623. In some embodiments, water with impurities continues into a third channel 631. The third channel may also comprise inner surfaces comprised of a hydrophilic material, such that pure water is separated from impurities as the unfiltered water moves through the third channel. When the water reaches a third trifurcation 634 pure water is again diverted by third diversion channels 624 into a third set of pure water channels 633. The water, now with a high concentration of impurities may then continue into a fourth channel 641 and out an impure water outlet 610.

Such a configuration may be fabricated into a filter wafer, such that a plurality of tracks 600 comprising a series of channels and trifurcations are formed into the filter wafer. The filter wafers may be stacked, as described herein, to form a filer cartridge which utilizes a series of trifurcations along each track 600 to increase the amount of pure water extracted from a volume of unfiltered water introduced into the filter cartridge. While a track 600 comprising a series of three trifurcations is depicted, the number of trifurcations may be varied to form a series of, for example, two, four, or five trifurcations provided in a series arrangement.

Figure 7:
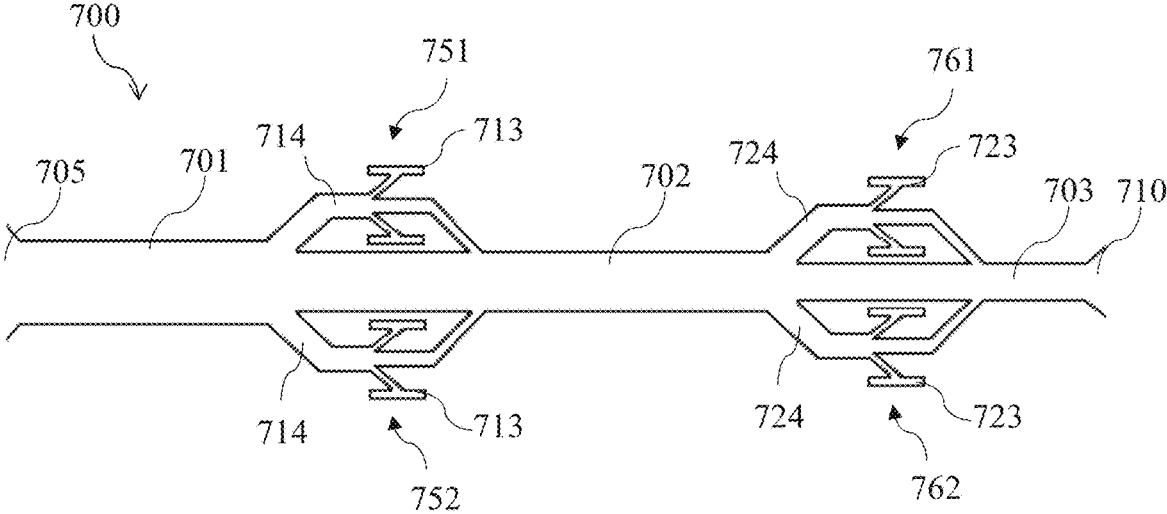
FIG. 7 depicts a parallel-serial channel configuration of a filter wafer component, according to some embodiments.

FIG. 7 depicts an example of a cascading trifurcation configuration wherein four trifurcations (751, 752, 761, 762) are provided in a parallel arrangement along a track 700. In some embodiments, unfiltered water enters a water inlet 705 and into a first channel 701. As described herein, the first channel may comprise inner surfaces comprised of a hydrophilic material, such that pure water is separated from impurities as the unfiltered water moves through the channel. In some embodiments, the pure water is diverted into the first diversion channels 714. In some embodiments, the first diversion channels comprise inner surfaces comprised of a hydrophilic material, such that pure water is again separated from impurities as the unfiltered water moves through the first diversion channels 714. At the first trifurcation 751 and second trifurcation 752, pure water from the first diversion channels 714 is diverted into pure water channels 713. In some embodiments, water containing impurities from the first diversion channels 714 is diverted into the second channel 702. In some embodiments, the second channel 702 comprises inner surfaces comprised of a hydrophilic material, such that pure water is separated from impurities as the unfiltered water moves through the channel. In some embodiments, the pure water is then diverted into second diversion channels 724. In some embodiments, the second diversion channels also comprise inner surfaces comprised of a hydrophilic material, such that pure water is again separated from impurities as the unfiltered water moves through the second diversion channels 724. At a third trifurcation 761 and fourth trifurcation 762, pure water from the second diversion channels 724 is diverted into pure water channels 723. In some embodiments, water containing impurities from the second diversion channels 624 is diverted into a third channel 703 and out an outlet 710 of the track 700.

Such a configuration may be fabricated into a filter wafer, such that a plurality of tracks 700 comprising trifurcations running parallel to the track are formed into the filter wafer. The filter wafers may be stacked, as described herein, to form a filer cartridge which utilizes the parallel configuration of trifurcations along each track 700 to increase the amount of pure water extracted from a volume of unfiltered water introduced into the filter cartridge. While a track 700 comprising four trifurcations arranged in a parallel configuration is depicted, the number of trifurcations may be varied to provide, for example, two, six, or eight trifurcations provided in a parallel arrangement.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system to purify water comprising:

a plurality of filter wafers, wherein a filter wafer comprises:

a plurality of first channels extending from a proximal end of the filter wafer toward a distal end of the filter wafer, each of the first channels comprising a first sidewall and a second sidewall; and a plurality of trifurcations, wherein a trifurcation is provided at a distal end of each of the first channels, each trifurcation dividing the first channel into a second channel, a third channel, and a fourth channel, wherein the fourth channel is parallel to the first channel, and wherein the second channel and the third channel are provided through a body of the filter wafer, wherein each of the first channel, the second channel, the third channel, and the fourth channel comprise hydrophilic surfaces; and wherein unfiltered water enters the plurality of first channels of the plurality of filter wafers and purified water is diverted from each first channel into the second channel and the third channel.

2. The system of claim 1, wherein the plurality of filter wafers is anodically bonded together to form a filter stack via at least one of hermetically sealing hydrophilic adhesive, annealing using sputtered titanium, direct silicon fusion bonding, or thermal compression bonding.

3. The system of claim 2, further comprising a bottom cover provided on a bottom of the filter stack, and wherein the bottom cover comprises a cutout to receive purified water from a plurality of second channels and third channels of the filter stack.

4. The system of claim 3, wherein a plurality of the second channels and the third channels of each filter wafer form purified water channels through the filter stack, and wherein the purified water channels run orthogonally relative to the plurality of first channels.

5. The system of claim 4, further comprising a top cover provided on a top of the filter stack.

6. The system of claim 5, wherein the bottom cover and the top cover are anodically bonded to the filter stack to form a filter cartridge via at least one of hermetically sealing hydrophilic adhesive, annealing using sputtered titanium, direct silicon fusion bonding, or thermal compression bonding.

7. The system of claim 6, wherein the plurality of filter wafers, the top cover, and the bottom cover comprise at least one of silicon wafers or, glass substrates.

8. The system of claim 2, wherein the filter stack is hermetically sealed with a hydrophilic adhesive, annealing using sputtered titanium, direct silicon fusion bonding, or thermal compression bonding.

9. The system of claim 1, wherein impure water is diverted from the first channel into the fourth channel.

10. The system of claim 9, wherein the impure water exits an impure water outlet formed by distal ends of a plurality of the fourth channels.

11. The system of claim 1, wherein the trifurcation comprises a first diversion channel in fluid communication with the second channel and a second diversion channel in fluid communication with the third channel.

12. The system of claim 11, wherein the first diversion channel and the second diversion channel each form an angle of at least one of 1 to 30 degrees, 30 to 60 degrees, 60 to 90 degrees, 90 to 120 degrees, 120 to 150 degrees, or 150 to 179 degrees with the first channel.

13. The system of claim 11, wherein the first and second diversion channels comprise a width of at least one of approximately 1 to 10, 10 to 60, 60 to 100, or 100 to 200 microns.

14. The system of claim 1, wherein the first channel comprises a width of approximately 200 to 600 microns.

15. The system of claim 14, wherein the fourth channel comprises a width of approximately 140 to 500 microns.

16. A system to purify water, comprising:
a plurality of filter wafers, a filter wafer comprising:
a plurality of first channels extending from a proximal end of the filter wafer toward a distal end of the filter wafer, each of the first channels comprising a first sidewall and a second sidewall, wherein the first and second sidewalls comprise a hydrophilic surface; and
a plurality of trifurcations, wherein a trifurcation is provided at a distal end of each of the first channels, each trifurcation dividing the first channel into a second channel, a third channel, and a fourth channel, wherein the fourth channel is parallel to the first channel, and wherein the second channel and the third channel are provided through a body of the filter wafer,
wherein unfiltered water enters the plurality of first channels of the plurality of filter wafers and purified water is diverted from each first channel into the second channel and the third channel; and
a water receptacle to receive the plurality of filter wafers and direct the unfiltered water to the plurality of first channels of the plurality of filter wafers.

17. The system of claim 16, wherein the water receptacle provides the unfiltered water to the plurality of first channels at a pressure head of at least 15 cm to 2 meters.

18. The system of claim 16, further comprising a bottom cover provided on a bottom of the plurality of filter wafers, wherein the bottom cover comprises a cutout providing an outlet for purified water received from a plurality of second channels and third channels, and wherein the outlet is provided outside a body of the water receptacle when the plurality of filter wafers is received by the water receptacle.

19. The system of claim 18, further comprising a top cover provided on a top of the plurality of filter wafers, wherein the plurality of filter wafers, the bottom cover, and the top cover are via at least one of anodically bonded, hermetically sealing hydrophilic adhesive, annealing using sputtered titanium, direct silicon fusion bonding, or thermal compression bonding to form a filter cartridge, and wherein the water receptacle receives the filter cartridge.

20. The system of claim 18, further comprising a top cover provided on a top of the plurality of filter wafers, wherein the plurality of filter wafers, the bottom cover, and the top cover are hermetically sealed with a hydrophilic adhesive, annealing using sputtered titanium, direct silicon fusion bonding, or thermal compression bonding.

* * * * *